(12) United States Patent
Herbst et al.

(10) Patent No.: US 7,999,921 B2
(45) Date of Patent: Aug. 16, 2011

(54) GEODESIC MEASURING INSTRUMENT WITH A PIEZO DRIVE

(75) Inventors: Christoph Herbst, Dornbirn (AT); Heinz Bernhard, Berneck (CH); Anton Häle, Widnau (CH)

(73) Assignee: Leica Geosystems AG, Heerbrugg (CH)

( * ) Notice: Subject to any disclaimer, the term of this patent is extended or adjusted under 35 U.S.C. 154(b) by 583 days.

(21) Appl. No.: 11/572,291

(22) PCT Filed: Jul. 22, 2005

(86) PCT No.: PCT/EP2005/053572
§ 371 (c)(1),
(2), (4) Date: Feb. 20, 2007

(87) PCT Pub. No.: WO2006/008318
PCT Pub. Date: Jan. 26, 2006

(65) Prior Publication Data
US 2008/0297760 A1  Dec. 4, 2008

(30) Foreign Application Priority Data

Jul. 22, 2004  (EP) .................................. 04017253

(51) Int. Cl.
*G01C 3/08* (2006.01)
(52) U.S. Cl. ................................................... 356/4.01
(58) Field of Classification Search .......... 356/3.01–22, 356/28, 28.5, 128, 128.5
See application file for complete search history.

(56) References Cited

U.S. PATENT DOCUMENTS

| | | | | |
|---|---|---|---|---|
| 3,588,249 A | * | 6/1971 | Studebaker | 356/4.08 |
| 5,949,531 A | * | 9/1999 | Ehbets et al. | 356/5.01 |
| 5,965,968 A | * | 10/1999 | Robert et al. | 310/310 |
| 6,046,800 A | * | 4/2000 | Ohtomo et al. | 356/141.1 |
| 6,128,071 A | * | 10/2000 | Melen | 356/4.05 |
| 6,411,371 B1 | * | 6/2002 | Hinderling et al. | 356/4.01 |
| 6,469,777 B2 | | 10/2002 | Shirai | |
| 2002/0070334 A1 | | 6/2002 | Hasegawa et al. | |
| 2002/0186361 A1 | * | 12/2002 | Ueno et al. | 356/4.01 |
| 2003/0169414 A1 | * | 9/2003 | Benz et al. | 356/5.1 |

FOREIGN PATENT DOCUMENTS

| | | |
|---|---|---|
| DE | 3936966 | 8/1990 |
| EP | 1024342 | 8/2000 |
| EP | 1070936 | 1/2001 |
| EP | 1314960 | 5/2003 |
| JP | 03-063812 | 6/1991 |
| JP | 03-138512 | * 6/1991 |
| JP | 10-115759 | 5/1998 |
| JP | 11311517 | 2/2000 |
| JP | 2002-071351 | 3/2002 |

OTHER PUBLICATIONS

Japanese Patent Office, Office Action dated Dec. 7, 2010, in Japanese patent application related to the present U.S. patent application.

* cited by examiner

*Primary Examiner* — Thomas Tarcza
*Assistant Examiner* — Luke Ratcliffe
(74) *Attorney, Agent, or Firm* — Maschoff Gilmore & Israelsen

(57) ABSTRACT

In a geodesic measuring instrument with a fixing device for positioning the measuring instrument and with a measuring component having an optical beam path for surveying a target, whereby the measuring components are mounted in an aligning component that can be moved relative to the fixing device, and can be moved relative to the aligning component, an optical beam path is modified by at least one piezoelectric micromotor.

22 Claims, 5 Drawing Sheets

GEODESIC MEASURING INSTRUMENT WITH A PIEZO DRIVE

The invention relates to a geodesic measuring instrument that is fit for field use.

In many geodesic measuring instruments an optical beam path must be modified, for instance by aligning components integrating the beam path or by focusing on a target. This modification must be precise, and in dynamic applications it must also be sufficiently fast, which implies that it will be disadvantageous, for instance, to have large masses being moved. Moreover, for a measuring instrument to be fit for field use, basic requirements are sturdiness of the drive, a low power consumption, and reliable operation within a wide temperature range.

Examples of such measuring instruments are the theodolites or tachymeters used for a multitude of surveying tasks, alone or in combination with integrated automated target acquisition and target tracking devices, where data acquisition or a mere verification as for instance in the surveyance of buildings are demanded. Another example of measuring instruments are scanner systems recording the topographies of surfaces in a scanning mode in the form of three-dimensional point clouds.

In solutions known so far, servomotors providing the drive for swivel or displacement of the components often are employed for these purposes. However, servomotors having a series-connected drive gear exhibit play on account of this mechanical arrangement, this play preventing a highly precise positioning in the open-loop procedure, and on the other hand they need this gear or other locking elements so that a positioning, once achieved, may be held.

Solutions involving electric motors turn out to be complicated, and associated with large space requirements, because of the continued verification of positionings actually achieved in the closed-loop procedure, and also because of the fixing elements needed.

In addition, combinations of electric motors and gear drives are unable to combine high axial speeds with a precise, slow fine aiming or with a positioning, since as a rule, the useful range of speeds of the motors is not wide enough.

Alternative drives such as electrostatic combs may be useful for very small adjustment ranges. Piezoelectric adjusting elements also have long been known as drive components moving optical elements or measuring axes. It is a disadvantage, however, that only small linear distances of travel as for instance a few 0.01 mm in order of magnitude can be attained, and even this demands a large electrical input. The position attained is only held in a transient manner, that is, while tension is applied. On account of creep effects, for instance, the position moreover is not stable over any longer period of time, and fluctuates with the precise value of applied high voltage. The same basic disadvantages are found when using stacked piezo elements, even though larger distances of travel, of up to 0.5 mm, may be achieved with them, the reason being more particularly that merely finite linear distances of travel are feasible while a direct rotation without play is not possible.

From EP 1 314 960, a geodesic measuring instrument is known where piezo elements are used to move a source of radiation within the housing of the instrument. However, the leeway of action that is available is limited by deformation of the piezo element. More particularly, an uninterrupted and unlimited movement in terms of an endless drive such as is needed for instance for rotation cannot be realised with a piezo actuator or piezo adjusting element, or with electrostatic devices.

In the printed version of US 2002/198 632, a mirror rotated horizontally that is driven by a conventional motor is mentioned which in the vertical direction is deflected by one or several piezoelectric materials. Thus, the movements are achieved by adjusting elements which in this application traverse the small adjustment ranges that have been described.

In EP 0 390 180, an optical block in a measuring device for the position of light beams in laser gyros is disclosed. The block is caused to vibrate with the aid of piezo elements. In addition, a mirror is readjusted to a small extent by a piezo element, this adjusting element also being described as a motor. In this instrument, too, piezo adjusting elements are used, their specific disadvantages here being irrelevant or acceptable in view of the application and mechanical specifications.

From the U.S. Pat. No. 4,585,969, a rotary drive is known which also uses piezo elements to generate rotary motions. Here a more complicated mechanical mechanism is used to produce rotary motions from dilational motions of the piezo elements. The motor thus created is said to enable a very precise positioning, so that it can be used in chip production or in measuring instruments. High speeds in particular are precluded by the complex arrangement which, moreover, is too complex for robust geodesic applications, and not fit for field use.

Such solutions as are known from the prior art, therefore, in most cases utilise individual piezo adjusting elements to move components when on account of the specific application, the limitations of these elements such as their small adjustment range do not entail any significant disadvantages. In addition, they are used in applications not subject to the restrictions arising in field use.

The problems cannot be solved, even when mechanical motors are combined with piezoelectric adjusting elements and the distance of travel generated by a servomotor for instance is tied to the highly precise positional change of the piezo adjusting element by means of a suitable mechanical arrangement. This combination and other, similar combinations retain the disadvantage of a very high voltage that must be maintained at the piezo element in order to hold the position reached. Inaccuracies of this high voltage will immediately produce position changes requiring an appreciable input for electronic adjustment. For an instrument fit for field use, the high power consumption associated with this adjustment is a further disadvantage.

It is a task of the present invention to provide a geodesic measuring instrument that is fit for field use and has a smaller number and/or complexity of its drive components and reduced overall size, respectively.

Further tasks consist in providing higher speeds of reaction of individual components as well as of the instrument as a whole.

It is a further task to provide a geodesic measuring instrument offering direct positioning or a smaller number of motions for a positioning or an aiming process.

It is a further task to provide a geodesic measuring instrument offering a simplified or improved manual alignability.

These tasks are solved, or the solutions developed further, by the objects of claim 1 or the dependent claims.

According to the invention, a geodesic instrument is designed in such a way that for field uses, piezoelectric micromotors can be used. In such micromotors, piezo vibrators acting in space and having contact elements are present as driving elements acting upon a suitable bearing surface, thus permitting an optimised motion when the piezo vibrator and bearing surface are suitably tuned. The spatial vibrating or oscillating motion is produced by the tuned arrangement and wiring of piezoelectric materials, while their contact element that is acting upon the bearing surface is induced by suitable controls to perform a propelling motion, elliptical for instance.

A piezoelectric motor having a multilayer structure is known from WO 00/74153. Via an arrangement of electrodes between which a piezoelectric material is placed, vibrations are induced that lead to motions of a contact element such as a ceramic pin, and indirectly to motions of a body that needs to be moved. Here the ceramic pin drives the body via a contact surface designed as bearing surface.

WO 98/53509 shows a piezoelectric micromotor which via a piezoelectric plate with edges and planar surfaces directly drives a shaft. Here the plate's surface is designed and tuned to the shaft in such a way that coupling takes place and the motions of the piezoelectric plate are transmitted to the shaft, causing it to rotate. Here, several micromotors may act upon a common shaft.

In WO 00/25370, a multidirectional motor is described where an alternation in the direction of rotation of a body is produced by tilting of the driving piezoelectric motor.

In EP 0 741 420, a device for rotating an element with curved surface about two orthogonal axes is disclosed. The device is driven by two pairs of piezoelectric motors.

In a drive for measuring instruments, such vibrated piezoelectric systems can be used as the micromotors if bearing surfaces exist that are designed according to the requirements of the geodesic instrument. In most cases, measuring instruments must include, both a mode of high-speed motion and a mode of highly precise positioning involving lowest speeds.

Using the inventive design of micromotor and bearing surface, it is possible to realise speeds, both in the range of nanometers per second and in the range of meters per second, using the same structure, free of play, and not upset by external motions, hence a highly precise positioning and rapid scanning motions are equally feasible. The position is maintained by friction, that is, by force lock, when tension is no longer applied. Therefore, a permanent power supply is not needed. Also, a rotary endless drive can be realised with these piezo vibrators, which is not possible with piezo adjusting elements. In addition, the number of moving parts is reduced relative to systems of the prior art.

According to the invention, in the geodesic measuring instrument a piezoelectric micromotor drives the component that needs to be adjusted, more particularly rotated or linearly displaced. This component modifies a beam path that is used for the measurement, for instance via an alignment or realignment or via focusing on a target. According to the invention, said components can be means for aligning a geodesic measuring instrument, but they can also be elements of the beam path within the instrument, such as folding mirrors or filter discs. A multitude of structures and detailed designs become possible, not only when translating a motion by direct transmission to a shaft but also, above all, when using a combination of contact element and bearing surface.

Linear motion is produced by the interaction between contact element and bearing surface, propulsion being produced by the contact element contacting the bearing surface while applying pressure. This coupling serves to transmit a propelling force yielding direct positioning via motions without play. The propelling forces and the speed can be configured directly via software. With the power off, the element supporting the bearing surface is fixed by the pressing force exerted by the contact element, so that an additional brake or fixing elements are not needed. The slipping clutch realised between the contact element and bearing surface still admits sliding when a certain maximum force is exceeded, so that damage or changes in position of the instrument as a whole may be avoided. For instance, distortion of a tripod that could occur during the fast manual alignment of a measuring instrument supported by the tripod is prevented. Here, the piezo drive is not used exclusively to generate motions. Rather, it is controlled electrically in such a way that the holding force is modified all the way from the maximum provided by friction to very small values. The position of the axis remains unchanged under these conditions.

Contrary to prior-art solutions based on drive gears, a mutual manual adjustment of instrument components is made possible by this slipping clutch, more particularly in combination with the controlled variation of the holding force, which means that a direct manual alignment of the instrument by the user for instance is possible. The manual alignment permits a rapid, user-friendly coarse alignment at the beginning or during a measuring job when the manual mode may even be supported explicitly by reducing the holding force. A precise repositioning via the motor can be achieved after any distortion when an encoder has been used to record the positions of the components relative to each other, which avoids long travels for positioning.

Sliding propulsion can be converted to rotary or tilting motions by suitably designed elements or bearing surfaces.

Components requiring mutual rotation can be moved by designing curved bearing surfaces. With the micromotor arranged in the point of intersection of two planes of rotation, it may after a rotation for instance be used to produce motions in the two planes of rotation. The bearing surfaces may include one and also several planes of rotation, for instance by using a spherical surface or design.

When several micromotors are used, it may be advantageous to associate them with one of the components and provide bearing surfaces on parts to be moved relative to this component. In this way an encapsulation of the micromotors and a joint power supply or controlling scheme can be realised.

Several micromotors may be arranged in series or on top of each other in order to raise the driving force.

Piezoelectric micromotors used according to the invention may serve as a scalable axle-drive system that can be used for moving the main components of the measuring instrument that is designed as a function of the intended major application. More particularly, a motion about the supporting and/or tilting axes of the measuring instrument may be induced. Here the use of several micromotors proves particularly advantageous, since their spatial arrangement according to the invention causes the resulting force that is produced by the bearing forces relative to the axis of rotation, to vanish, taking load off the axle bearing.

Moreover, in view of the silent drive, uses are possible in environments that are critical with respect to noises, such as churches.

With piezoelectric micromotors, speeds reduced to almost any desired low value are feasible for fine aiming, which implies that a highly precise positioning is possible. In view of the small moving masses, the measuring instrument can be designed highly dynamically, so that the high speeds required for sampling or scanning processes can equally well be attained. Thus, a measuring instrument according to the invention can also be designed as a target tracking system, a laser tracker, or a scanner.

Without an adjustment in consideration of the other components of the instrument, known embodiments of prior-art piezoelectric micromotors prove inappropriate for geodesic applications involving requirements resulting from field use.

For physical reasons, the temperature range within which piezoelectric micromotors can reasonably be operated has very narrow limits and falls far short of the requirements arising in measuring instruments fit for field use, so that thus far their usefulness was not evident.

In the arrangements according to the invention, this temperature dependence of performance of the drives is taken into account, e.g., by permanently monitoring and optimising the controlling frequency of the piezo elements. Different quantities measured may serve as a basis for interventions.

Where a measuring system such as an encoder is present at the moving component, one may select as a function of measured temperature a basic value of frequency, and starting from this value vary the frequency by minor amounts until finding the maximum speed of motion.

With systems lacking an encoder or comparable measuring possibilities from which the speed could be deduced, one may measure the currents while modifying the controlling frequency, and determine a suitable operating point on the basis of this relationship.

Relative to a selection of the controlling frequency, exclusively on the basis of measured temperature, which is also possible according to the invention, these two methods offer essential advantages. Specimen scatter and manufacturing tolerances that always are present have the effect that at any given temperature, different individual motors will need different controlling frequencies. During operation, the piezo material inside the micromotors warms up. This warming can be determined, only indirectly and with a certain delay, via the temperature of the motor housing. However, any temperature change will immediately cause a decrease of output unless the frequency is readjusted.

The two methods described solve these problems by continuously readjusting the controlling frequency.

In view of the simple structure of piezoelectric micromotors and of the inventive design of a geodesic instrument, moreover, an operation of the instrument that is maintenance-free or involves reduced maintenance is possible.

The geodesic measuring instrument according to the invention is described or explained in greater detail, and merely by way of example, in the following in terms of exemplary embodiments represented schematically in the drawing. In detail, FIG. 1 is the schematic representation of a drive by piezoelectric micromotors;

FIG. 2 is the representation of a circuit diagramme for addressing a piezoelectric micromotor in a measuring instrument;

FIGS. 3a-b are the pictorial and schematic representations of a theodolite as a first exemplary embodiment of a measuring instrument according to the invention;

Figures 7A, 7B, 7C:
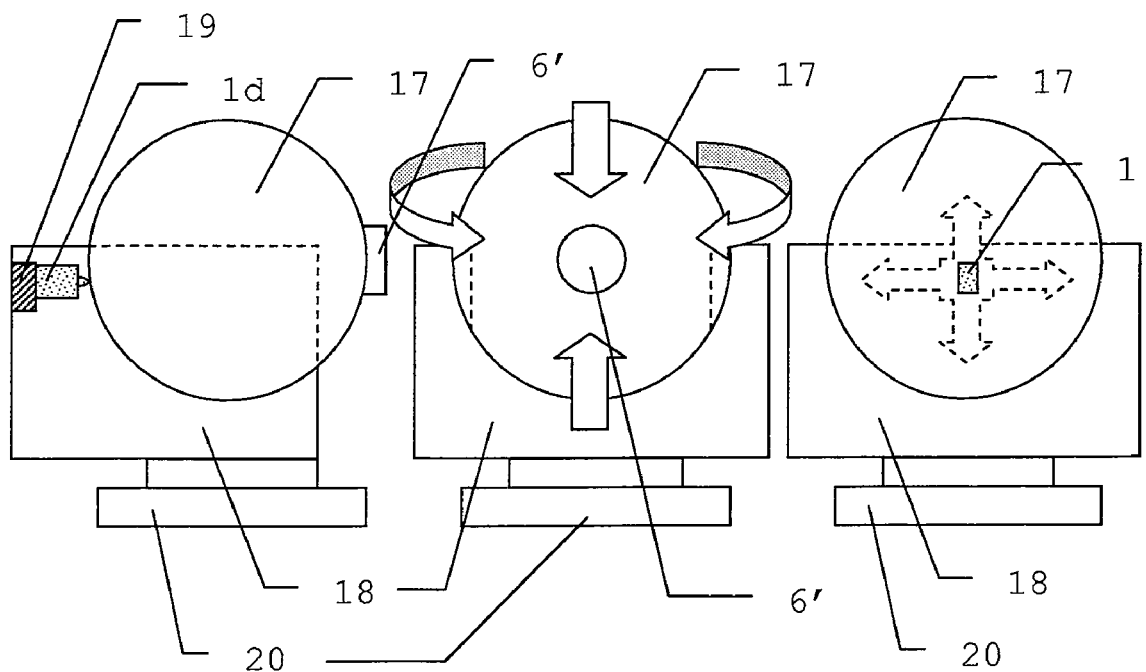
Figures 8A, 8B:
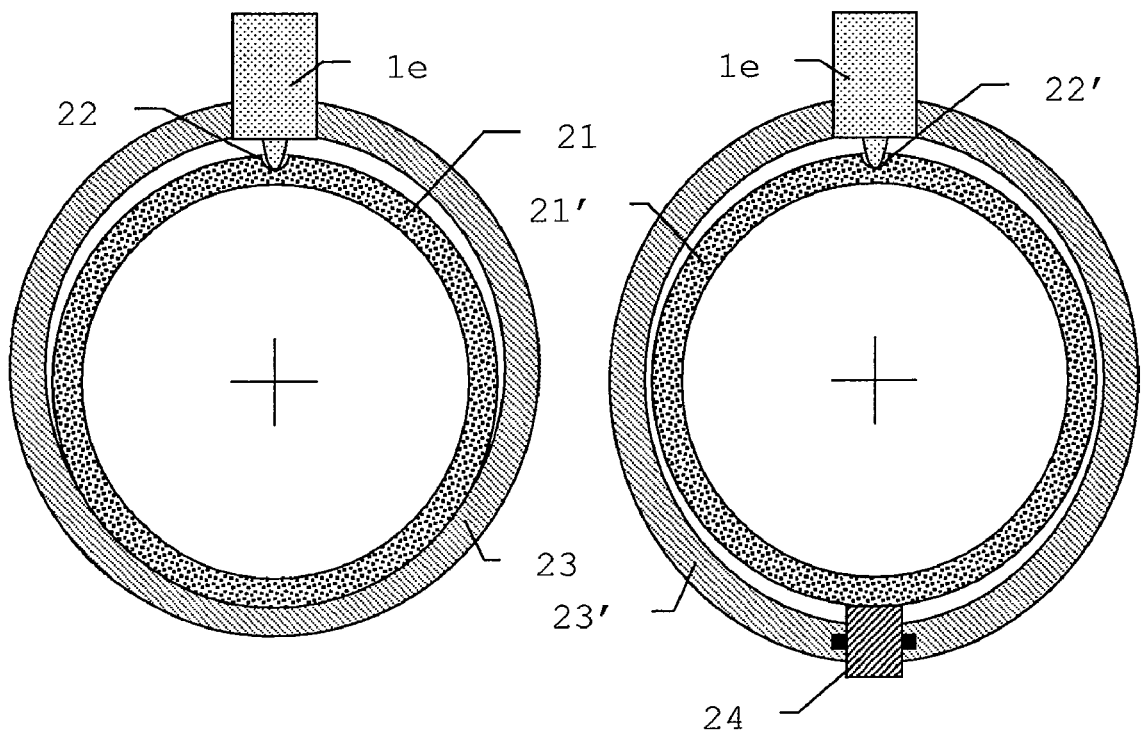
Figure 9:
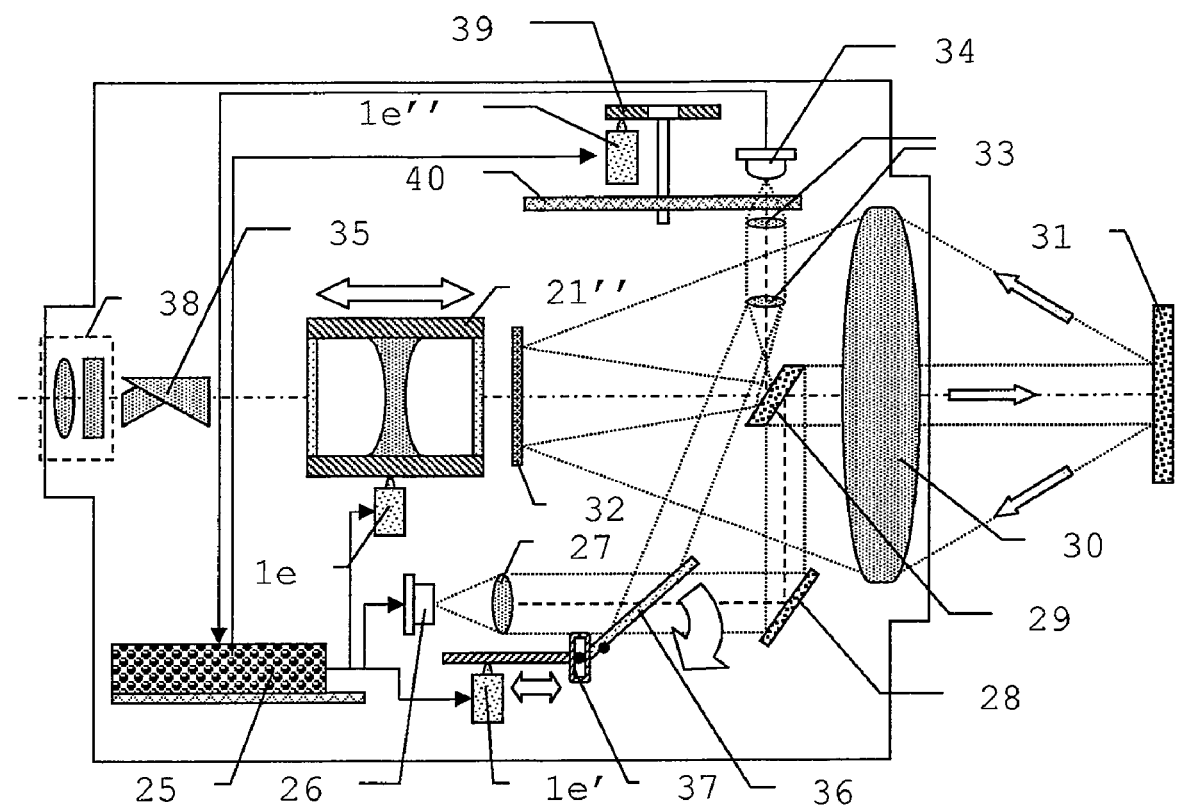

FIGS. 7a-c are the schematic representation of a fourth exemplary embodiment of a measuring instrument according to the invention;

FIGS. 8a-b are the schematic representation of a drive of optical elements by piezoelectric micromotors; and FIG. 9 is the schematic representation of a fifth exemplary embodiment of a measuring instrument according to the invention.

Figure 1:
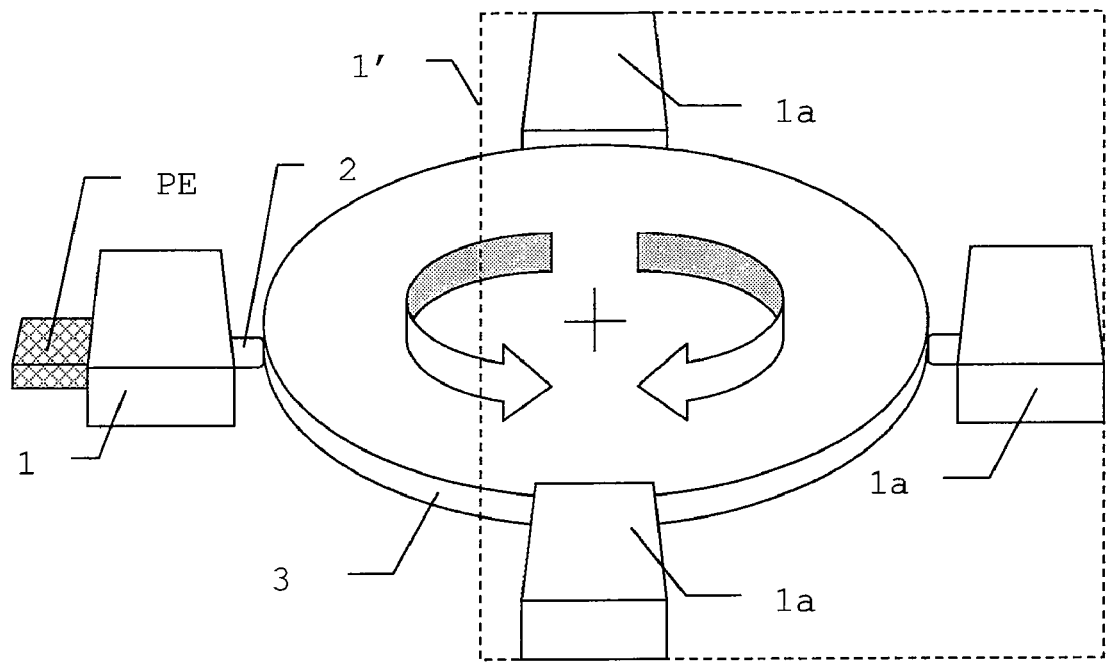

FIG. 1 is the schematic representation of a drive by a piezoelectric micromotor 1. This includes at least one motion-transmitting contact element 2 while a motion-receiving element, here a bearing surface 3, is assigned to the contact element 2. The motion-receiving element transforms the motion of contact element 2 into the desired motion. Another realisation of such a motion-receiving element would for instance be a disc having an eccentric opening into which the contact element 2 becomes engaged thus giving rise to a rotation.

A micromotor 1' may also consist of a number of partial micromotors 1a which relative to a component to be moved are arranged so as to produce like actions. In this example, a disc-shaped element having a circular ceramic surface as the bearing surface 3 is driven by three partial micromotors 1a arranged as an endless drive. By rotation of such an element, for instance, one may design the optical beam path of a measuring component that can be moved or fixed. The forward thrust produced by micromotors 1 can be configured freely by software, while the direct approach of a position may also be realised or improved, inasmuch as imprecisions caused by the play of gears need not be compensated. The pressure exerted on bearing surface 3 by micromotor 1 or its contact element 2 can by made variable by a further component, e.g., a piezo element PE. By a selective variation of the pressing force, a manual adjustment of the individual components can be facilitated. Another application is that of producing an enhanced pressing force when in unfavourable angular positions the distribution of the masses or corresponding moments of inertia is strongly asymmetric. Variable pressing forces allow a small force to be applied in the normal range while in unfavourable positions, the force may be raised in succession. In this way the wear, which is low at any rate, may be further reduced.

As shown in this exemplary embodiment, at least two piezoelectric micromotors 1a may be arranged so as to act alike in their thrust direction, in a cascade or stack, in particular, in order to attain higher thrust. Basically, though, measuring instruments according to the invention may also be driven or moved by merely a single piezoelectric micromotor 1.

Figure 2:
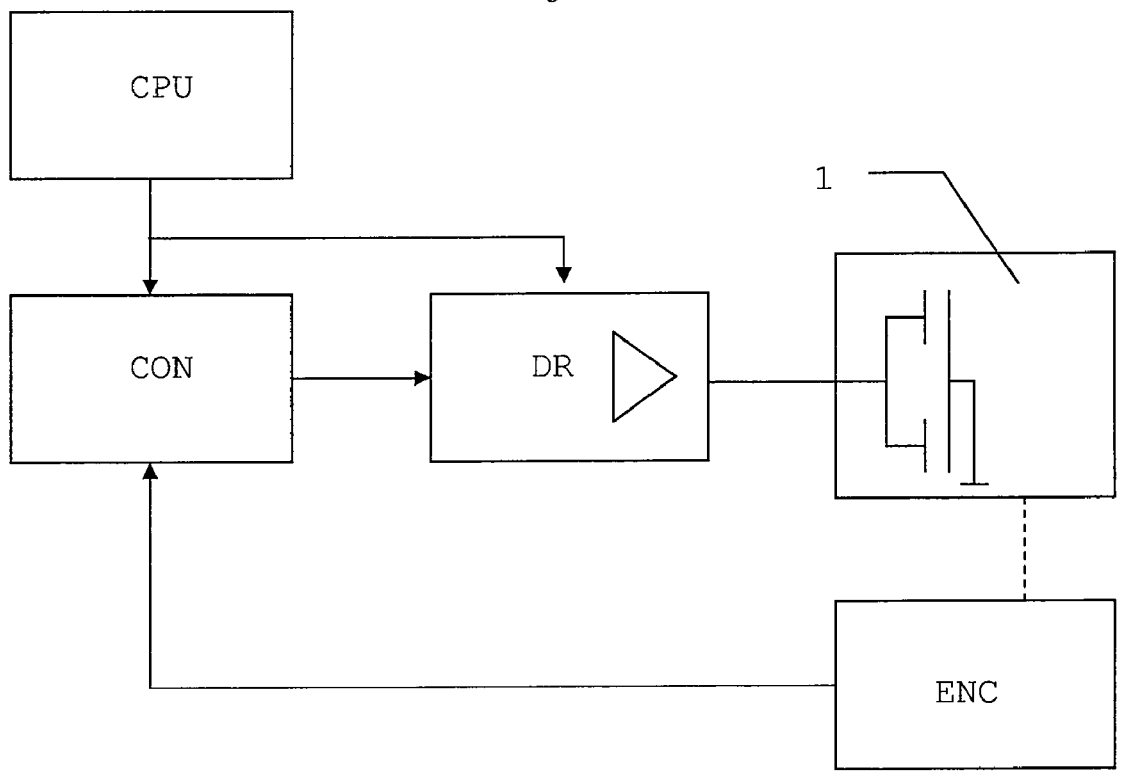

FIG. 2 is the representation of a circuit diagramme for controlling a piezoelectric micromotor in a measuring instrument. Via a controller CON and a driver DR, a processor CPU controls a piezoelectric micromotor 1, the linear control being secured by direct control of driver DR by processor CPU. The current position of the component moved by the micromotor 1 is captured by an encoder ENC, for instance a goniometric sensor. Basically, a direct positioning of the component is possible in view of linear scalability of the forward thrust, however, it may be advantageous to use such an encoder ENC, since distortions may happen on account of the slipping clutch, and upset existing correlations between the stored nominal and true current position. Thus, encoder ENC continuously verifies the true position of the component, and in view of the forward thrust without play, a direct positioning is feasible without the numerous fine corrections required in prior-art solutions.

Figures 3A, 3B:
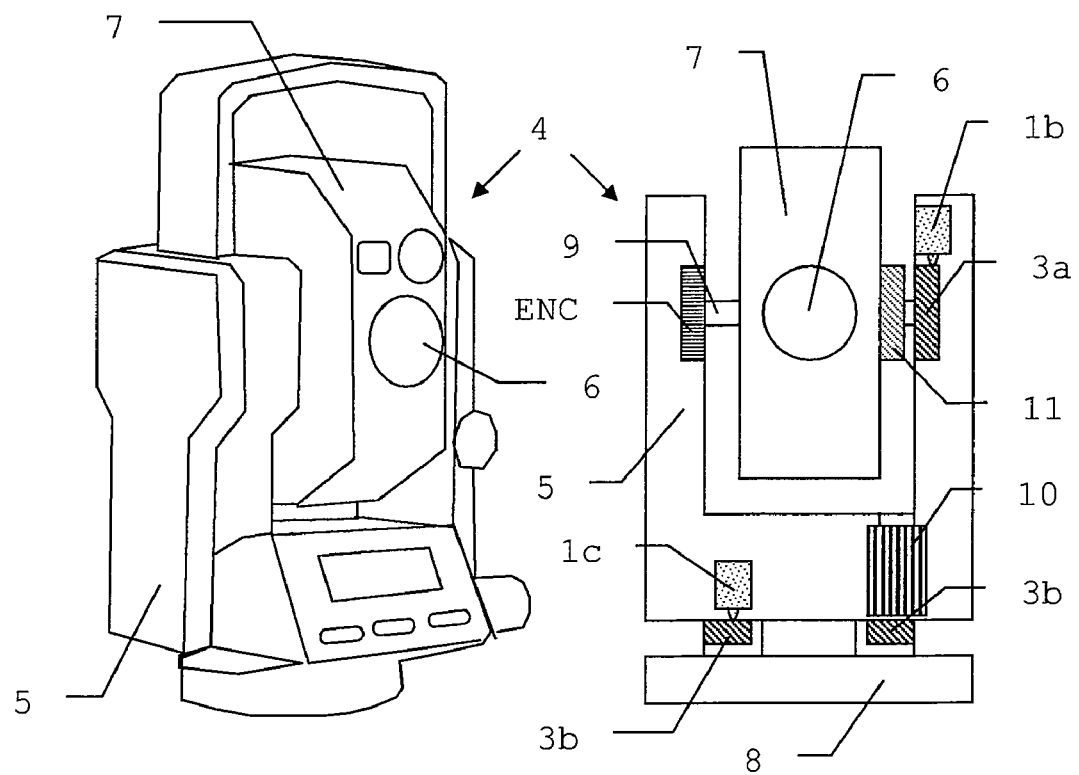

FIGS. 3a-b are the pictorial and schematic representations of a theodolite or total station as a first exemplary embodiment of a measuring instrument according to the invention.

In FIG. 3a, a total station is represented as a geodesic measuring instrument 4 having an aligning component 5 and a measuring component 7. The measuring component 7 includes an objective lens 6 through which a beam path to a target to be surveyed is defined. The aligning component can be rotated about a vertical support axis relative to a mounting support not shown here. By supporting the measuring component 7 in the aligning component 5, it becomes possible to move the measuring component 7 about a horizontal tilt axis. The mobility about support and tilt axes allows a large space angle range to be covered, a complete coverage of the surrounding space becoming possible when using a design with a measuring component 7 that can be turned through the support.

For the same measuring instrument 4, FIG. 3*b* provides a schematic simplified representation. Via an axle 9, the measuring component 7 with objective lens 6 is journaled rotatably relative to the aligning component 5. Axle 9 has a curved bearing surface 3*a* to which a micromotor is assigned as measuring motor 1*b*, this measuring motor 1*b* contacting the bearing surface 3 radially and causing a rotation about the tilt axis. The current position of measuring component 7 relative to aligning component 5 is acquired by an encoder ENC. Radiation to be used for surveying a target can be emitted through objective lens 6 or through an additional beam path parallel to the optical axis of the objective lens which includes a telemetric unit 10 emitting laser radiation, and an associated mirror 11, such that the environment can be scanned by moving the measuring component 5. Rotation of the aligning component 5 about the support axis is produced by a second micromotor, the aligning motor 1*c*, which axially contacts an annular bearing surface 3*b* arranged within mounting support 8. Using this aligning motor 1*c* one can rotate the aligning component 5 relative to the mounting support 8, the arrangement functioning as an endless drive. As a rule, an encoder—not shown here—is also assigned to this axis, to that the alignment of the components relative to the support and tilt axes can be recorded and verified precisely. A jerky motion of the aligning component 5 will produce slipping of the contact element of the second micromotor 1*b* on bearing surface 3*b*, so that mounting support 8 experiences no change in position. Thus, this arrangement uncouples the aligning component 5 and mounting support 8 with respect to voluntary or undesired jerky motions. By cooperation of measuring motor 1*b* and aligning motor 1*c*, the beam path can be moved and aligned, and thus modified, about two axes. A structurally favourable controlling and power supply can be secured when arranging all micromotors within a single component.

Figure 4:
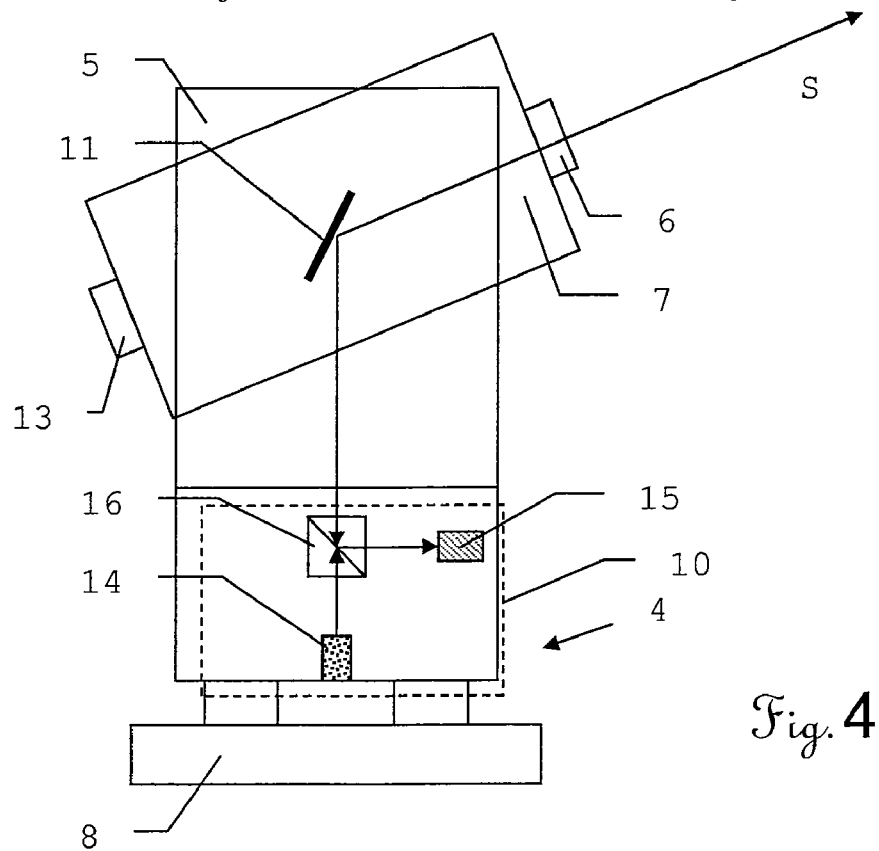
FIG. 4 is the schematic representation of the first exemplary embodiment of a measuring instrument according to the invention, in a side elevation.

FIG. 4 is the schematic representation of the first exemplary embodiment of a measuring instrument 4 according to the invention, in a side elevation. In this first embodiment, the measuring component 7 includes an ocular 13 situated opposite to the objective lens 6, so that a user may take a direct look. Embodiments according to the invention may equally well be realised with other recording or aligning systems, for instance with a camera system, and even without an ocular 13. The telemetric unit 10 includes a laser source 14 sending laser radiation S via a beam divider 16 and the mirror 11 to a target. After reflection at the target, the radiation is received back, and is guided via the mirror 11 and beam divider 16 to a sensor 15. By the alignment of mirror 11, the laser radiation is emitted and received back along an axis parallel to the beam path through objective lens 6. However, in another embodiment according to the invention, the entire telemetric unit 10 may equally well be integrated as well into the measuring component 7, so that the laser radiation S is also emitted and received, coaxially via objective lens 6.

Figure 5:
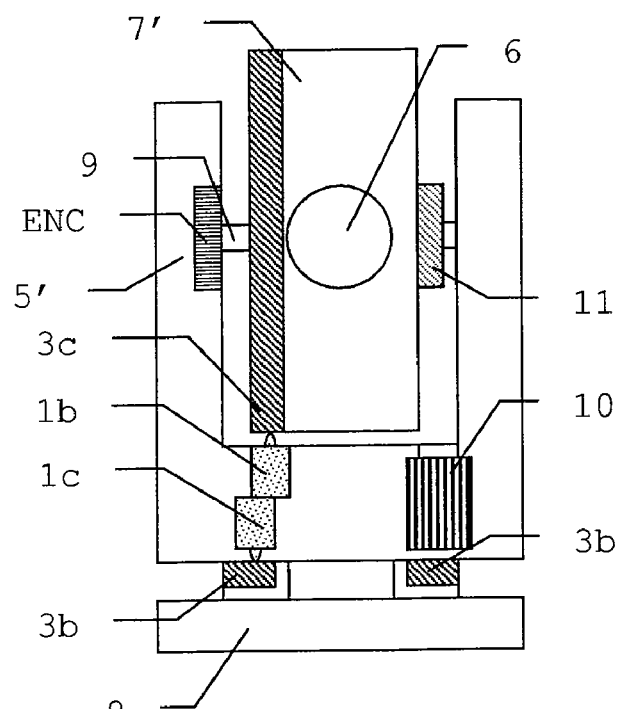
FIG. 5 is the schematic representation of a theodolite as a second exemplary embodiment of a measuring instrument according to the invention.

A second exemplary embodiment of a measuring instrument according to the invention is schematically represented in FIG. 5. The measuring instrument again includes a measuring component 7' with objective lens 6, a mirror 11 fixed to an axis 9, a mounting support 8, and an aligning component 5' with encoder ENC and telemetric unit 10, the measuring component 7' being journalled rotatably relative to aligning component 5' by means of the axis 9. As in the first exemplary embodiment, aligning component 5' can be moved relative to the mounting support 8 by an aligning motor 1*c* and assigned annular bearing surface 3*b*. In this second exemplary embodiment, however, the curved bearing surface 3*c* assigned to measuring motor 1*b* is not attached to axis 9 but arranged directly at the measuring component 7'. Here the bearing surface may cover an angular range of 360°, or only a circular segment. Using this structure one can arrange the two micromotors very close together, so that a compact supply becomes possible. If the curved bearing surface 3*c* and the annular bearing surface 3*b* are arranged so as to be opposite at least in part, then a single micromotor may contact both bearing surfaces, provided it can swivel. The functions of measuring motor 1*b* and aligning motor 1*c* are then combined in a single micromotor that can be swiveled through 180°.

Figure 6:
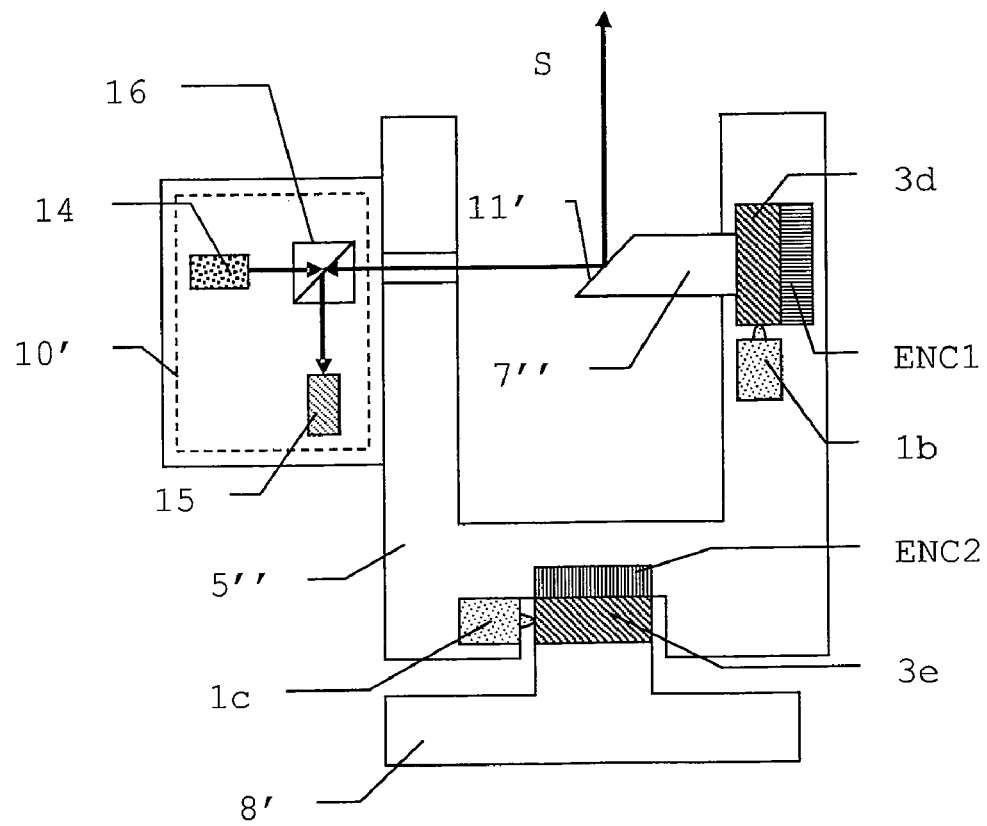
FIG. 6 is the schematic representation of a scanner as a third exemplary embodiment of a measuring instrument according to the invention.

FIG. 6 is the schematic representation of a scanner, as a third exemplary embodiment of a measuring instrument according to the invention. In a telemetric unit 10' with laser source 14 and beam divider 16, laser radiation S is generated and guided to a measuring component 7" provided with an inclined mirror surface 11'. The mirror surface 11' or measuring component 7" can be rotated about a horizontal axis relative to the aligning component 5", by the combination of measuring motor 1*b* and an assigned bearing surface 3*d*, so that basically an angle of 360° can be sampled. The direction of emission or position of the mirror surface is detected via a first encoder ENC1. The laser radiation reflected by a target being scanned is received back via the same mirror surface 11', and guided via beam divider 6 to sensor 15. By the combination of aligning motor 1*c* and an assigned, curved bearing surface 3*d*, it is possible to rotate the aligning component 5" relative to the mounting support 8' about the support axis, so that a complete, scanning sampling of space is possible by virtue of the combined motions of measuring component 7" and aligning component 5". The position of aligning component 5" relative to mounting support 8' is detected via a second encoder ENC2. In this exemplary embodiment, the two bearing surfaces 3*d* and 3*e* are formed as radially contacted cylinder envelopes. Other shapes and ways of contacting may also be selected. Thus, both bearing surfaces may be designed as axially contacted annular surfaces.

FIGS. 7*a*-*c* provide the schematic representation of a fourth exemplary embodiment of a measuring instrument according to the invention, with FIG. 7*a* representing a side elevation, FIG. 7*b* a front elevation and FIG. 7*c* a rear elevation. In this exemplary embodiment, the measuring and aligning components are integrated into a body of rotation 17 as a common component including the objective lens 6', this component being mobile about two axes. A receptacle 18 for the body of rotation 17 is now assigned to mounting support 20, this support 20 and receptacle 18 being mounted so as to be fixed or mobile relative to each other. The body of rotation 17 is moved by a single micromotor 1*d* that can be rotated through 90° by an adjusting element 19, or discretely or continuously varied in the thrust direction. Forward thrust is now achieved by contact with the surface of the body of rotation 17 that has a spherically curved bearing surface. This variant of the embodiment admits good encapsulation of the optical components in a closed component. With a design of the micromotor 1*d* such that it can be changed in its position, and thus is continuously adjustable in the thrust direction, then the micromotor 1*d* may always be aligned so as to be tangential to the thrust direction, so that an optimum forward thrust will be obtained in the desired direction of motion. An example of such a change in alignment of the motor by a second piezoelectric motor is described in EP 1 127 380. One thus can omit a separation of the motion into two orthogonal components, and their generation by two separate motors.

The body of rotation 17 need not—as shown in this example—be essentially spherical. According to the invention, merely parts of a spherical surface or surfaces having a different kind of curvature, e.g., with a variable radius of curvature, may be used.

FIGS. 8*a-b* explain the drive of optical elements by piezoelectric micromotors in a schematic representation. As a complement or alternative to the exemplary embodiments represented in the earlier figures, a modification of the optical beam path may also be achieved by influencing it within the measuring or aligning component.

FIG. 8*a* shows an optical element 21, e.g., a lens in a focusing slide supported as focusing element in a guide body 23, e.g., a telescope body, so as to be longitudinally mobile. With a micromotor as the adjustment motor 1*e*, optical element 21 is pressed against one surface of guide body 23, and thus fixed in its position. The pressing force of the adjustment motor 1*e* thus gives rise to a sliding bearing within the guide body 23. Here the friction in guide body 23 must be smaller than the thrust of adjustment motor 1*e*. The contact element of adjustment motor 1*e* contacts the optical element 21 in a groove 22 serving as guide groove, so that the optical element 21 is held fixed against rotation.

For focusing, prior-art systems use a lens element that can be shifted within the beam path, and is moved along by a guide track via a pin attached to the lens mount. The guide track is designed as a helix within a cylinder that is rotatably arranged. Here the system is so designed that the centre of rotation should coincide with the centre of the lens system. Costly spring systems guaranteeing the required positional fidelity are used to avoid deviations of the centres. In a theodolite, moreover, gravity must also be compensated in the extreme positions on account of the large useful range of angles. The drive according to the invention that is achieved by the piezoelectric adjustment motor 1*e* replaces these spring systems by adopting a design such that the static pressing force of the piezo system assumes the corresponding fixing function. A distortion of the focusing body is prevented by a suitable design of the guide track. This arrangement allows a bearing without play, without dead run, and without hysteresis to be realised, so that a fast and direct positioning is possible, which moreover can be held in a durable way. In addition, some components of prior-art solutions can be omitted, so that the measuring instrument becomes more compact and sturdy.

In the prior art, the rotatable cylinder described above is driven directly or via gears. As an alternative, the guide pin can also be driven directly with a toothed rack or screw. These technical solutions have the common feature of necessarily exhibiting a certain play on account of their construction. The hysteresis that arises from this play hampers and slows the focusing process.

The bearing represented in FIG. 8*b* also relies on the motion of an optical element 21' within a guide body 23' that is produced by an adjustment motor 1*e*, though no sliding friction is involved here, rather, a countercylinder 24 absorbs the pressing force. This makes it possible to reduce the friction that must be overcome by the drive during motions. It may be necessary though to use further elements for fixation, e.g., further countercylinders or springs, in order to guarantee safe functioning in all angular ranges.

FIG. 9 shows the schematic representation of a fifth exemplary embodiment of a measuring instrument according to the invention. Here the optical beam path is modified within the telescope of a theodolite, as the example of a geodesic measuring instrument according to the invention. Via reflective reversing means 28 and 29 and an objective lens 30, light is emitted to a target 31 by a source of radiation 26 which, together with analysing electronics 25, is arranged on a common support element. After its reflection by the target 31, the light is recaptured by the objective lens 30, and is guided via a dichroitic mirror element 32, the reflective reversing means 29, and a lens system 33 to receiver 34 for signal processing. The signal of receiver 34 is processed by analysing electronics 25, and distance data are derived.

A calibrating flap 36 is located in the beam path as a first optical element deviating part of the light emitted by the source of radiation 26, directly to the receiver 34, so that a reference track is realised within the instrument. For a separation of the reference measurement from the normal measuring process, calibrating flap 36 can be moved into the optical beam path so that a separate measuring track leads to the receiver 34 via the calibrating flap 36 and the lens system 33. Calibrating flap 36 is moved into the beam path by a first piezoelectric micromotor that is controlled by the analysing electronics 25, serves as the first adjustment motor 1*e'*, and drives a push rod 37 connected via a joint with the calibrating flap 36.

Apart from the means for signal processing, the theodolite's telescope includes visual optics making the light reflected back from the target 31 useful for a human observer or for a camera where applicable. A focusing member 21" as the second optical element and an ocular member 38 are used to this end; in turn, they may include a number of components such as an inverting prism 35, for instance. The focusing member 21" is moved by a second piezoelectric micromotor serving as the second adjustment motor 1*e*, in a way similar to that shown in FIG. 8*a* or FIG. 8*b*. A guide body enveloping or positioning the focusing member 21" is not shown for reasons of transparency. The second adjustment motor 1*e* is also controlled by the analysing electronics 25.

A third piezoelectric micromotor serving as the third adjustment motor 1*e"* that is also controlled by the analysing electronics 25 is used to move a filter wheel 40 serving as a third optical element, the third adjustment motor 1*e"* axially contacting an annular bearing surface on a drive wheel 39, and thus moving the filter wheel 40 via an axle. The filter wheel 40 may for instance be used to reduce high intensities that might occur at the receiver 34 when working at close range. According to the invention, all the optical elements may also be realised individually, or in any combination, in geodesic measuring instruments, while two or more of the optical elements may be moved by a common adjustment motor.

Relative to the prior art, the use of piezoelectric micromotors as described above has substantial advantages inasmuch as the micromotor application according to the invention solves the problem of fixing the filter flap or any other optical element that serves to temporarily or permanently modify the beam path. Up to now, constructive measures such as a catch had to be provided for this purpose.

With the filter disc designed as a sky filter, the filtering action will change as a function of position of the disc. It is highly important, therefore, to precisely maintain a filter position once it has been set. Using the detent torque of a step motor is often too imprecise here, inasmuch as the number of detent positions is very small. Higher precision is offered when using a three-phase motor. However, here one must live with the disadvantage that the position can only be held under continued power supply. When used in a field instrument, therefore, battery life will be shorter than in the described application of the piezoelectric micromotors.

It is evident for one skilled in the art that the different means for modifying the optical beam path may be combined with each other in an alternative or complementary way. Micromotors may also be arranged at points of the geodesic measuring instrument other than those represented.

The invention claimed is:

1. A geodesic measuring instrument comprising:
a mounting support for positioning the measuring instrument;
a measuring component for aligning an optical beam path toward a target;
an aligning component, wherein the measuring component is supported within the aligning component that is mobile relative to the mounting support;
a piezoelectric micromotor, wherein the optical beam path is configured to be modified by the piezoelectric micromotor;
the piezoelectric micromotor having a motion-transmitting contact element, wherein the motion-transmitting contact element is operated so as to oscillate in space; and
a motion-receiving element, wherein the motion-receiving element is assigned to the contact element, wherein the motion-receiving element includes a bearing surface, wherein the contact element and the bearing surface form a slipping clutch for rotational movement of the motion-receiving element.

2. The geodesic measuring instrument of claim 1, wherein the geodesic measuring instrument includes a theodolite.

3. The geodesic measuring instrument of claim 1, wherein the alignment component is rotatable about a support axis, and wherein the alignment component is mobile relative to the aligning component about a tilt axis.

4. The geodesic measuring instrument of claim 1, wherein the contact element and the bearing surface form a slipping clutch, the contact element and the bearing surface being manually movable relative to one another.

5. The geodesic measuring instrument of claim 1, wherein the bearing surface is arranged at the mounting support and/or at the measuring component.

6. The geodesic measuring instrument of claim 1, wherein a continually linear or rotary motion is generated by the cooperation of the contact element and the at least one motion-receiving element.

7. The geodesic measuring instrument of claim 1, wherein the micromotor can be addressed by a computer in the geodesic measuring instrument in such a way that the thrust forces or detent forces of the micromotor can be configured freely.

8. The geodesic measuring instrument of claim 7, wherein the computer in the geodesic measuring instrument provides a driving frequency that can be readjusted continually.

9. The geodesic measuring instrument of claim 8, wherein:
the computer varies the driving frequency by minor amounts starting from a basic value that is temperature-dependent until the maximum of a speed of motion has been found; or
the computer varies the driving frequency while measuring currents as functions of time and determining therefrom an optimum working value of the driving frequency.

10. The geodesic measuring instrument of claim 1, wherein the mounting support and measuring component each include a curved bearing surface or an annular bearing surface.

11. The geodesic measuring instrument of claim 1, wherein for a modification of the optical beam path the aligning component is configured so that it can be moved by the micromotor as an aligning motor, and/or the measuring component is made so that it is configured to be moved by the micromotor as the measuring motor or by a further piezoelectric micromotor as the measuring motor.

12. The geodesic measuring instrument of claim 11, wherein the bearing surface of the mounting support is contacted axially by the assigned contact element of the aligning motor and the bearing surface of the measuring component is contacted radially by the assigned contact element of the measuring motor.

13. The geodesic measuring instrument of claim 11, wherein the measuring motor and the aligning motor are arranged within the aligning component.

14. The geodesic measuring instrument of claim 1, wherein the measuring component and the aligning component are designed as a common component, this component being mobile about two axes via a spherically curved bearing surface.

15. The geodesic measuring instrument of claim 1, wherein, at least one optical element is configured to be moved to the optical beam path by the micromotor by a further piezoelectric micromotor as the adjustment motor, and wherein the at least one optical element is capable of being shifted or folded into the beam path.

16. The geodesic measuring instrument of claim 15, wherein the optical element includes a lens and is supported so that it can be displaced relative to a guide body longitudinally, the adjustment motor causing the optical element to be pressed against the guide body and/or against one or several counter cylinders.

17. The geodesic measuring instrument of claim 15, wherein the optical element includes a groove-shaped bearing surface assigned to the adjustment motor.

18. The geodesic measuring instrument of claim 15, wherein the optical element is a calibrating flap that is configured to be moved into the optical beam path that is switched over to a measuring track.

19. The geodesic measuring instrument of claim 15, wherein the optical element is an optical filter wheel that is configured to be moved into the optical beam path.

20. The geodesic measuring instrument of claim 1, wherein the micromotor includes at least two assigned partial piezoelectric micromotors, the partial micromotors acting in like manner in their thrust direction through a cascaded or stacked arrangement.

21. A geodesic measuring instrument comprising:
a mounting support for positioning the measuring instrument;
a measuring component for aligning an optical beam path toward a target;
an aligning component, wherein the measuring component is supported within the aligning component that is mobile relative to the mounting support;
a piezoelectric micromotor, wherein the optical beam path is configured to be modified by the piezoelectric micromotor;
the piezoelectric micromotor having a motion-transmitting contact element, wherein the motion-transmitting contact element is operated so as to oscillate in space; and a motion-receiving element, wherein the motion-receiving element is assigned to the contact element, wherein the motion-receiving element includes a bearing surface to which motion is transmitted by the motion transmitting contact element.

22. A geodesic measuring instrument comprising:
a mounting support for positioning the measuring instrument;
a measuring component for aligning an optical beam path toward a target;
an aligning component, wherein the measuring component is supported within the aligning component that is mobile relative to the mounting support;
a piezoelectric micromotor, wherein the optical beam path is configured to be modified by the piezoelectric micromotor; and
the piezoelectric micromotor having a motion-transmitting contact element, wherein the motion-transmitting contact element is operated so as to oscillate in space;
a motion-receiving element, wherein the motion-receiving element is assigned to the contact element, wherein the motion-receiving element includes a bearing surface to which the motion transmitting contact element contacts for rotational movement of the motion receiving element, wherein a frictional lock is present between the motion-receiving element and the motion-transmitting contact element when rotation is not being transmitted thereby.

* * * * *